(12) United States Patent
Khaled Asef et al.

(10) Patent No.: US 10,970,611 B2
(45) Date of Patent: Apr. 6, 2021

(54) DOUBLE-SIDED BUTTON WITH A TOUGH FUNCTION

(71) Applicant: Mohammad Khaled Asef, Vienna (AT)

(72) Inventors: Mohammad Khaled Asef, Vienna (AT); Ernst Stottinger, Vienna (AT); Valentin Jilch, Perchtholdsdorf (AT)

(*) Notice: Subject to any disclaimer, the term of this patent is extended or adjusted under 35 U.S.C. 154(b) by 0 days.

(21) Appl. No.: 16/476,821

(22) PCT Filed: Jan. 9, 2018

(86) PCT No.: PCT/EP2018/050439
§ 371 (c)(1),
(2) Date: Jul. 9, 2019

(87) PCT Pub. No.: WO2018/130515
PCT Pub. Date: Jul. 19, 2018

(65) Prior Publication Data
US 2019/0377995 A1    Dec. 12, 2019

(30) Foreign Application Priority Data

Jan. 11, 2017  (EP) ..................................... 17150949

(51) Int. Cl.
*G06K 19/06*   (2006.01)
*G06K 19/077*  (2006.01)
(Continued)

(52) U.S. Cl.
CPC . *G06K 19/07701* (2013.01); *G06K 19/07345* (2013.01); *G06Q 20/341* (2013.01);
(Continued)

(58) Field of Classification Search
CPC ......... G06K 19/0725; G06K 19/07345; G06Q 20/04
(Continued)

(56) References Cited

U.S. PATENT DOCUMENTS 6,390,373 B1 * 5/2002 Beyer .................... G06K 19/07
                                                           235/487
8,201,747 B2 * 6/2012 Brown ................. G06K 19/077
                                                           235/492
(Continued)

FOREIGN PATENT DOCUMENTS

WO    2010035705    4/2010
WO    2014114743    7/2014

OTHER PUBLICATIONS

Sandra Wobrazek; "Handcheque: Diese Karte Macht Dein Geldtascherl schlank", Dec. 5, 2016; https://www.trendingtopics.at/schluss-mit-dem-platzproblem-in-der-geldboerse/.
(Continued)

*Primary Examiner* — Ahshik Kim
(74) *Attorney, Agent, or Firm* — Workman Nydegger

(57) ABSTRACT

A push-button comprising a first switch contact and a second switch contact which are arranged spaced apart and parallel to each other. The first switch contact is designed for establishing an electrical line connection to the second switch contact when force is applied. The push-button comprises a third switch contact which is arranged spaced apart from the second switch contact and in parallel on a side opposite to the first switch contact. The third switch contact is designed for establishing an electrical line connection to the second switch contact when force is applied. Furthermore, the push-button comprises an evaluation unit which is designed for additionally operating the first and/or the third switch contact(s) as a capacitive or inductive touch sensor.

10 Claims, 2 Drawing Sheets

(51) Int. Cl.
　　　*G06K 19/073*　　　(2006.01)
　　　*G06Q 20/34*　　　(2012.01)
　　　*H01H 13/702*　　　(2006.01)

(52) U.S. Cl.
　　　CPC ....... *H01H 13/702* (2013.01); *H01H 2231/05* (2013.01); *H01H 2239/006* (2013.01)

(58) Field of Classification Search
　　　USPC ......................................................... 235/492
　　　See application file for complete search history.

(56) References Cited

U.S. PATENT DOCUMENTS

| | | | |
|---|---|---|---|
| 8,748,803 B2* | 6/2014 | Guillaud | G06K 19/07345 250/221 |
| 2008/0099556 A1 | 5/2008 | Park | |
| 2015/0097038 A1 | 4/2015 | Narendra | |
| 2019/0286805 A1* | 9/2019 | Law | G06F 21/34 |
| 2019/0340481 A1* | 11/2019 | Locke | G06K 19/0723 |
| 2020/0034830 A1* | 1/2020 | Ortiz | G06Q 20/3678 |

OTHER PUBLICATIONS

Patrick Dax; "Start-up bringt universelle Kreditkerte mit Touchscreen—futurezone.at"; Nov. 18, 2016; https: //futurezone.at/thema/start-ups/start-up-bringt-universelle-kreditkarte-mit-touchscreen/231.322.841.

* cited by examiner

DOUBLE-SIDED BUTTON WITH A TOUGH FUNCTION

BACKGROUND OF THE INVENTION

Field of the Invention

The invention relates to a push-button comprising a first switch contact and a second switch contact which are arranged spaced apart and parallel to each other, wherein the first switch contact is designed for establishing an electrical line connection to the second switch contact when force is applied.

Description of the Related Art

Push-buttons are operating elements which are used on a plurality of electronic devices, such as, for example, mobile phones, computer keyboards and control panels.

Conventional push-buttons are mechanical devices which are operated by applying force. They have a stable initial state and a metastable state, wherein the transition from the initial state to the metastable state is realized by applying mechanical force to the first switch contact. If no force acts on the first switch contact, the push-button is in the initial state. In this state, the first and the second switch contacts are spaced apart. When the push-button is activated, they are made to touch each other in the metastable state, and an electrical line connection is established. When the application of force onto the first switch contact ends, the push-button independently enters into the initial state, and the electrical line connection is interrupted. Push-buttons according to the prior art are designed, for example, as push-buttons with snap domes, membrane keys or spring buttons.

A further possibility of implementing a push-button is to design it according to a capacitive or inductive principle. Capacitive push-buttons according to the prior art do not have any mechanically movable components. They consist of two electrodes which are arranged spaced apart and parallel to each other, are supplied with an auxiliary voltage and possess electrical capacitance. The electrodes are applied to supports such as glass or films and are scanned with an evaluation unit. If the carrier of the capacitive push-button is touched, the capacitance changes. This change is recorded by the evaluation unit. Inductive push-buttons use active input elements which generate a magnetic field. In the conducting components of the push-button, an electric current is induced by this, which is recorded by the evaluation unit.

Conventional mechanical push-buttons have the disadvantage that maloperations can occur, in particular when they are used in mobile electronic devices, as they often are exposed to mechanical influences. Additional screens or protective covers for preventing this increase the space required by the device, which is often not desirable.

Capacitive or inductive push-buttons have the disadvantage that they are functional only when they are supplied with an auxiliary voltage. When they are used in mobile electronic devices, this causes their service life to be significantly reduced, especially in case of limited battery capacities. Furthermore, this type of push-button is also prone to maloperations due to unintentional touches.

In addition, push-buttons according to the prior art have the disadvantage that they constitute operating elements which have only a single input option. They are able to provide only simple information which indicates that the push-button is pressed at a certain point in time, or is not pressed. As a result, the possibilities of using push-buttons according to the prior art on modern electronic devices are greatly restricted, in addition to a space requirement which is comparatively high.

BRIEF SUMMARY OF THE INVENTION

It is the object of the invention to create a push-button which overcomes the above-mentioned disadvantages.

According to the invention, the present object is achieved in that the push-button comprises a third switch contact which is arranged spaced apart from the second switch contact and in parallel on a side opposite to the first switch contact, wherein the third switch contact is designed for establishing an electrical line connection to the second switch contact when force is applied, and the push-button comprises an evaluation unit which is designed for additionally operating the first and/or the third switch contact(s) as a capacitive or inductive touch sensor.

The design according to the invention of the push-button provides the advantage that the result is a push-button which, in comparison to push-buttons according to the prior art, has a significantly higher number of input options. The first and the third switch contacts can be designed so as to be conducting or non-conducting toward the outside, for example under a flexible film, so that a key is formed. Thus, instead of a single input option (the push-button is just being pressed or, respectively, is not being pressed), additional input options can be realized on a push-button according to the invention. They are broken down as follows:

pressure on the first switch contact
    pressure on the third switch contact
    touching of the first switch contact
    touching of the third switch contact In this case, it is particularly advantageous that a combination of the above-mentioned input options can be used for generating combined input methods, such as, for example, simultaneous pressure on the first and the third switch contacts or, respectively, simultaneous touching of the first and the third switch contacts. In comparison to push-buttons according to the prior art, the push-button according to the invention thus provides the advantage that it constitutes an operating element which involves significantly more extensive potential uses, with the required space being the same.

A further advantage is that the push-button according to the invention does not have to be supplied continuously with an auxiliary voltage, but said voltage can be activated only by pressing on the first or the third switch contact, or, respectively, simultaneously on the first switch contact and the third switch contact. In this way, it is achieved that the push-button according to the invention does not exhibit a constant power consumption, whereby the service life of mobile devices, on which it is used, is prolonged. In addition, a possible maloperation is prevented, or at least the likelihood of a maloperation is reduced.

By means of a variable configuration of the surface of the second switch contact, different distances between the first switch contact and the second switch contact as well as between the third switch contact and the second switch contact can be realized. As a result, the haptic feedback during the operation of the first switch contact and the third switch contact can be designed differently.

The switch contacts of the push-button according to the invention can be realized using, for example, films with integrated conducting elements, metal lamellae, FP, PCBA, etc. This leads to the advantage that push-buttons according to the invention can have a very low profile, as a result of which they are particularly suitable for use in thin plastic cards such as smart cards, debit cards or credit cards. Further areas of application are, for example, e-ink-based displays such as price tags, information signs, product codes or IDs.

A preferred application of push-buttons according to the invention can be found in smart cards for use as a means of payment. These are thin cards which comprise a card body usually made of plastic and may include a number of active and inactive input and output elements, data memory, as well as identification and transmission devices such as wireless network interfaces, RF-ID (Radio Frequency Identification) antennae or NFC (Near Field Communication) units and comprise a secure element. A use of such active elements requires an independent energy supply in the form of thin batteries for their operation. However, due to the limited dimensions of such smart cards, which are usually produced in credit card format, the storage capacity of those energy storage units is very limited. Furthermore, the small space allowances lead to the fact that input elements are preferably used which require a small space, while at the same time providing an extensive number of input options and a low energy demand Those properties are advantageously provided by a push-button according to the invention. A further advantage associated with the use of push-buttons according to the invention on a smart card of this kind is that they can also be used for activating and deactivating the smart card so that it does not exhibit any energy consumption when it is not in use. In this connection, it is particularly advantageous that, furthermore, the smart card cannot be read in the deactivated state.

A smart card designed as described above is capable of bringing together the functions of a number of bank cards and credit cards by allocating a unique card number and a range of sequence numbers to the smart card. Those sequence numbers can be used for identifying a particular bank card or credit card. For this purpose, the allocation of a particular bank card or credit card is stored in the data memory of the smart card as well as in a network data storage. In this way, a user is advantageously enabled to select a particular bank card or credit card for a payment directly on the smart card, using one or several push-buttons according to the invention. In a procedure of payment processing, the card number of the smart card as well as the sequence number allocated to the respective selected bank card or credit card are transmitted to a payment service provider system. This system is able to access the network storage and to determine the allocation of the selected bank card or, respectively, credit card to the respective sequence number of the smart card. Thus, the payment process can then be handled via the selected bank card or, respectively, credit card.

Advantageous embodiments of the push-button according to the invention as well as alternative embodiment variants are explained in further detail below with reference to the figures.

DETAILED DESCRIPTION OF THE INVENTION

Figure 1:
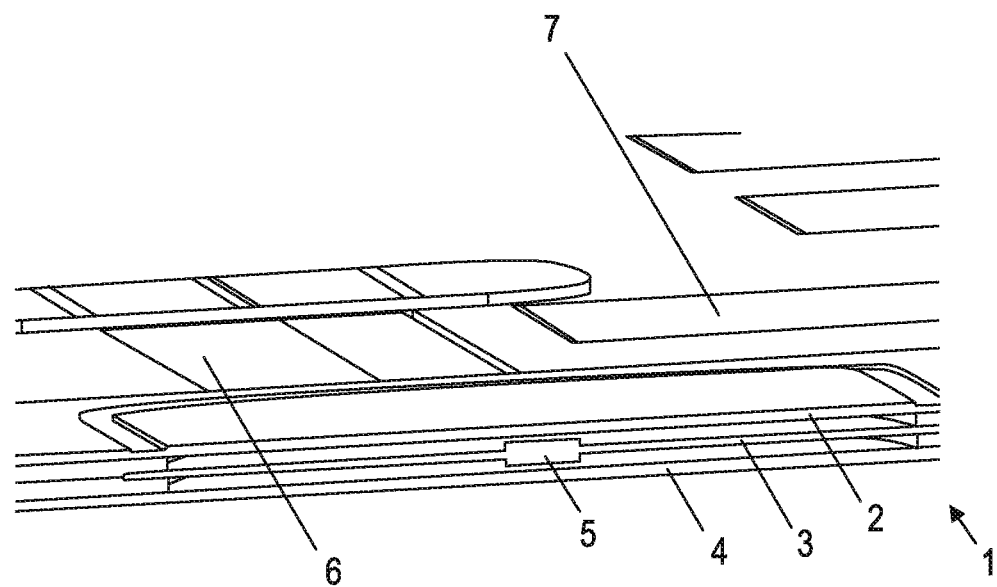
FIG. 1 shows an illustration of a section through a push-button according to the invention.

FIG. 1 shows a vertical section through a push-button 1 according to the invention in a perspective view in a preferred embodiment variant. The push-button 1 is composed of a first switch contact 2, a second switch contact 3 and a third switch contact 4, which are arranged in parallel to each other and do not touch each other in an initial state of the push-button 1 as illustrated. The second switch contact 3 is disposed between the first 2 and the third 4 switch contact. In the preferred embodiment variant as illustrated, the switch contacts can be designed by flexible films, metal lamellae, FP, PCBA, etc., wherein the sides of the first 2 and the third switch contact 4, which are opposite to the second switch contact 3, can be designed so as to be electrically conducting or non-conducting. If a user of the push-button 1 exerts a force on the first switch contact 2 or the third switch contact 4, the respective switch contact approaches the second switch contact 3 until it touches the latter and, in a metastable state, establishes an electrical line connection, across which current can flow. If the application of force ends, the push-button 1 returns to the initial state, and the line connection is interrupted. This arrangement according to the invention of the switch contacts 2, 3 and 4, which is illustrated in FIG. 1, advantageously permits double-sided operation of the push-button 1 according to the invention.

In the preferred embodiment variant illustrated in FIG. 1, the push-button 1 exhibits a thickening or elevation 5 in the middle of the second switch contact 3. The distance of the second switch contact 3 to the first 2 and, respectively, the third switch contact 4 is thereby reduced. As a result, the advantage is obtained that the force which is necessary for the operation of the push-button 1 can be varied in a simple way. In alternative embodiment variants, this thickening or elevation 5 can be formed in various places on the side of the second switch contact 3, which side is allocated to the first switch contact 2 or, respectively, the third switch contact 4. Furthermore, different distances to the first 2 and the third switch contact 4 can thereby be realized. Advantageously, it is thus possible to provide the user with a different haptic feedback for the operation of the first 2 or the third switch contact 4.

Furthermore, the push-button 1 illustrated in FIG. 1 comprises an evaluation unit 6 as well as an energy storage unit 7. The energy storage unit 7 provides an auxiliary voltage which enables the evaluation unit 6 to record touches of the push-button 1 on a capacitive or, respectively, inductive basis. In an alternative embodiment variant, the auxiliary voltage is provided by means of a power source such as, for example, a power supply.

The integration of the evaluation unit 6 in the push-button 1 according to the invention allows the operation of the push-button 1 as an inductive or capacitive touch sensor operable on both sides, in addition to its characteristics as a mechanical push-button operable on both sides. This results in the advantage that additional input options can be realized with a single push-button 1. In alternative embodiment variants, it is also possible to operate only the first switch contact 2 or only the third switch contact 4 as a touch sensor.

The energy storage unit 7 illustrated in FIG. 1 can assume an operational state and a non-operational state. Switching from the operational state into the non-operational state, or vice versa, can be accomplished by simultaneously applying pressure to the first 2 and the third switch contact 4. In this way, a line connection between the first 2, the second 3 and the third switch contact 4 is established. This feature enables that the energy storage unit 7 provides an auxiliary voltage for the operation of the push-button 1 as a capacitive or, respectively, inductive touch sensor only when necessary. As a result, the advantage is obtained that a discharge of the energy storage unit 7 when the push-button 1 is not in use is prevented. In alternative embodiment variants, the switching between the operational state and the non-operational state can also be realized via a pressure exclusively on the first 2 or the third switch contact 4 or, respectively, any desired combination of the above-mentioned possibilities. If the push-button according to the invention is used in electronic devices, this feature can be used for preventing unintended activation of the respective device and thus increasing activation security.

Figure 2:
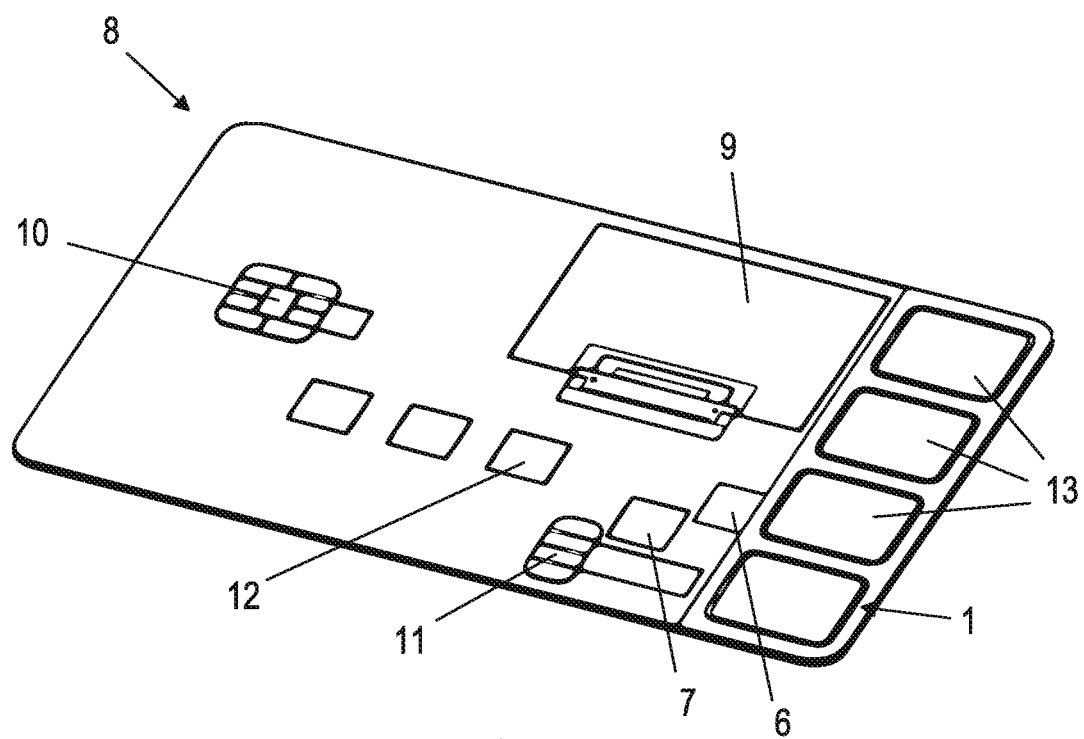
FIG. 2 shows an illustration of a smart card comprising a push-button according to the invention.

FIG. 2 shows a perspective view of a smart card 8 which includes a push-button 1 according to the invention as per FIG. 1, with an associated evaluation unit 6 and an energy storage unit 7. In addition, the smart card 8 comprises a display 9, a secure element 10, an identification and transmission device 11, a data memory 12 as well as three input elements 13. The input elements 13 may either also be designed as push-buttons 1 according to the invention, or, in alternative embodiments, as mechanical push-buttons, inductive touch sensors or capacitive touch sensors, or any combination thereof. The identification and transmission device 11 can be designed as an RFID antenna, an NFC module or any other device for wireless or contact-bound communication. The display 9 can be designed as a conventional LCD display, e-ink display or the like. Furthermore, it can be designed in a touch-sensitive way. The energy storage unit 7 of the push-button 1 is used for supplying power to the other components of the smart card 8. Due to the advantageous design of the push-button 1, it is thus possible, as described in FIG. 1, to set the energy storage unit 7 in the operable state as well as the non-operable state, thus activating or, respectively, deactivating the entire smart card 8. As a result, the advantage is obtained that a discharge of the energy storage unit 7 when the smart card 8 is not in use is prevented. Thus, it is also prevented that the smart card 8 can be read out. In a further embodiment variant, several push-buttons 1 according to the invention can be used on one smart card 8. As a result, activation security can be additionally increased in that it is necessary, for example, to simultaneously operate several push-buttons 1 so as to set the energy storage unit 7 in the operable state. Furthermore, this can be utilized for retrieving specific security functions by a combined operation of different push-buttons 1. Due to the particularly thin structure of the push-buttons 1, it becomes possible, for example, that they are arranged next to each other, at the top and at the bottom on a device such as the described smart card 8. In this way, a particularly ergonomic design of the positions of the push-buttons 1 can be achieved. This opens up the possibility, for example by placing the smart card 8 on a flat surface, of operating only one side of the push-button 1 either by touch or by application of force or, respectively, pressing.

In the preferred embodiment variant, a card number is allocated to the smart card 8 illustrated in FIG. 2, via which card number the smart card 8 can be identified clearly. A range of sequence numbers are allocated to this card number subsequently. This provides the advantage that the smart card 8 exhibits a unique identification, wherein different operating modes of the smart card, which will be described below, can be allocated to the sequence numbers.

The use of one or, in alternative embodiment variants, a plurality of push-buttons 1 according to the invention in the smart card 8 illustrated in FIG. 2 advantageously enables a number of different input options. If the smart card 8 is placed on a flat surface, for example either the first 2 or the third switch contact 4 of the respective push-button 1 that is used can be pressed or, respectively, touched independently of each other. This may be used, for example, for entering PIN codes or unlock codes, which prevent unauthorized users from using the smart card 8.

Figure 3:
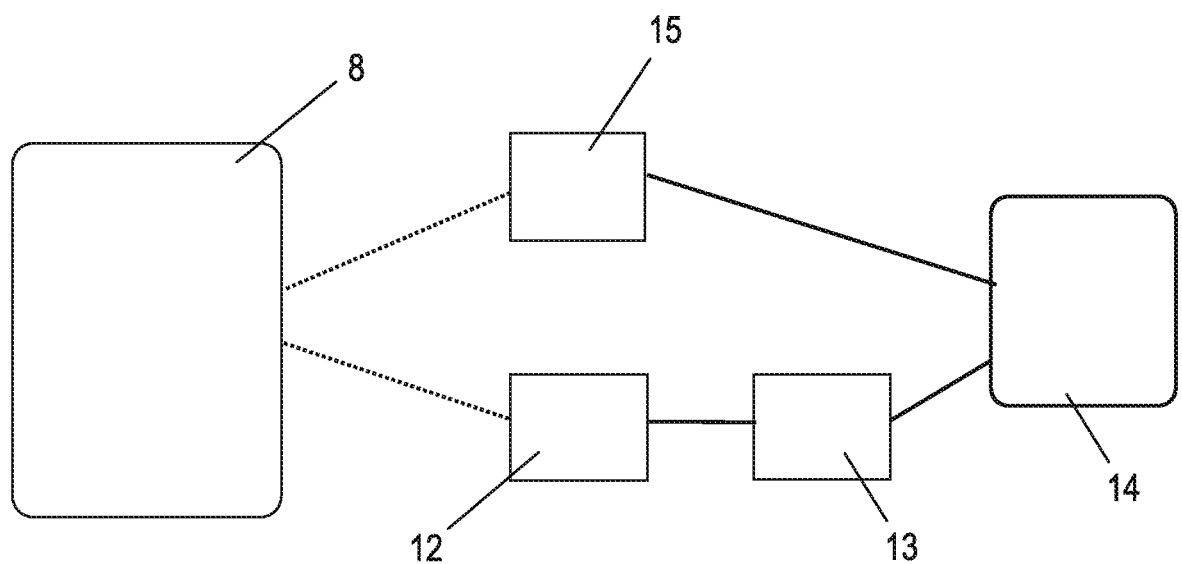
FIG. 3 shows a flow chart of a method of using a smart card according to FIG. 2 for the transmission of payment information.

FIG. 3 shows a flow chart of a method of using a smart card 8 according to FIG. 2 for the transmission of payment information. In a preferred embodiment variant, the identification and transmission device 11 of the smart card 8 illustrated in FIG. 2 is arranged to communicate with a card reading device 12 or, respectively, to be connectable therewith. A card reading device 12 can be any point of sale terminal, a bank card or credit card reading device, by means of which payment transactions can be handled. Said device is arranged to access a payment service provider system 13, which is able to access a network data storage 14. Upon the connection of the smart card 8 to the card reading device 12, the identification and transmission device 11 transmits the card number as well as a sequence number to the card reading device 12.

Because of this, the smart card 8 can be used for the handling of payment transactions, as it is able to bring together the functions of several bank cards and credit cards. For this purpose, a sequence of initialization steps is performed. They consist in allocating one of the sequence numbers of the card number of the smart card 8 to a selected bank card or, respectively, its bank card number, or to a credit card or, respectively, its credit card number, and in depositing this allocation in the data memory 12 of the smart card 8 as well as in the network data storage 14. The network data storage 14 is a memory which is accessible via a data network such as, for example, the internet. The allocation is effected by connecting the smart card 8 to a computer unit 15 such as, for example, a smart phone, tablet, laptop or desktop computer. Through the connection to the smart card 8, the computer unit 15 gains access to the data memory 12 of the smart card 8. Furthermore, the computer unit 15 has access to the data network and thus the network data storage 14. The computer unit 15 executes a processing program which allows a user of the smart card 8 to perform the allocation, with the processing program storing said allocation in the data memory 12 of the smart card 8 as well as in the network data storage 14.

A connection of the smart card 8 to the computer unit 15 is necessary only for the purpose of performing the initialization steps. If those have been carried out, the smart card 8 is capable of independently transmitting payment information. Using the smart card 8, the user of the smart card 8 directly chooses a bank card or credit card for this purpose, which has previously been initialized in the course of the initialization steps. Subsequently, the identification and transmission device 11 transmits the card number of the smart card 8 and the sequence number, which previously has been allocated to the selected bank card or credit card, to the card reading device 1. Said device transmits the card number and the sequence number to the payment service provider system 13. The payment service provider system 13 accesses the network data storage 14 in order to retrieve the allocation of the sequence number for the bank card or credit card chosen by the user. As a result, the payment service provider system 13 receives information as to which account allocated to the bank card or the credit card is to be charged with the payment process.

If a bank card is chosen by the user for the handling of the payment process in an alternative embodiment variant, the bank card number of the selected bank card is transmitted to the card reading device 12 directly via the smart card 8. Subsequently, the bank card is identified directly by means of the secure element 10 via the card reading device 12.

This method provides the advantage that, in this way, the smart card 8 is able to assume the functions of several bank cards and credit cards.

The invention claimed is:

1. A push-button comprising:
   a first switch contact and a second switch contact which are arranged spaced apart and parallel to each other,
      wherein the first switch contact is designed for approaching the second switch contact until the first switch contact touches the latter and for establishing an electrical line connection to the second switch contact when force is applied,
   wherein:
      the push-button comprises a third switch contact which is arranged spaced apart from the second switch contact and in parallel on a side opposite to the first switch contact,
      wherein the third switch contact is designed for approaching the second switch contact until the third switch contact touches the latter and for establishing an electrical line connection to the second switch contact when force is applied,
      and the push-button comprises an evaluation unit which is designed for additionally operating the first and/or the third switch contact(s) as a capacitive or inductive touch sensor.

2. The Push-button according to claim 1, wherein the push-button comprises an energy storage unit which can assume an operable state, in which the energy storage unit supplies the evaluation unit with voltage, and a non-operable state.

3. The Push-button according to claim 2, wherein an application of force both onto the first switch contact and onto the third switch contact establishes a line connection between the first, the second and the third switch contact and brings the energy storage unit from the non-operable state into the operable state, or from the operable state into the non-operable state.

4. The Push-button according to claim 2, wherein an application of force onto the first switch contact or onto the third switch contact brings the energy storage unit from the non-operable state into the operable state, or from the operable state into the non-operable state.

5. The Push-button according to claim 1, wherein the second switch contact exhibits a thickening or elevation which reduces a distance from the second switch contact to the first and/or the third switch contact.

6. The Push-button according to claim 1, wherein the distances of the first switch contact to the second switch contact as well as of the third switch contact to the second switch contact are differently sized.

7. A smart card comprising:
   at least one push-button, the push button comprising:
      a first switch contact and a second switch contact which are arranged spaced apart and parallel to each other,
         wherein the first switch contact is designed for approaching the second switch contact until the first switch contact touches the latter and for establishing an electrical line connection to the second switch contact when force is applied,
      wherein:
         the push-button comprises a third switch contact which is arranged spaced apart from the second switch contact and in parallel on a side opposite to the first switch contact,
         wherein the third switch contact is designed for approaching the second switch contact until the third switch contact touches the latter and for establishing an electrical line connection to the second switch contact when force is applied, and
      an evaluation unit which is designed for additionally operating the first and/or the third switch contact(s) as a capacitive or inductive touch sensor, wherein a card number as well as a plurality of sequence numbers are allocated to the smart card.

8. The smart card according to claim 7, wherein the smart card further comprises at least one of an identification and transmission device, a secure element, a data memory, a display, an inductive touch sensor as well as a capacitive touch sensor, wherein the identification and transmission device can be connected to a card reading device, which is designed for accessing a payment service provider system, which is designed for accessing a network data storage.

9. A method for transmitting payment information with a smart card comprising:
   at least one push-button, the push-button comprising:
      a first switch contact and a second switch contact which are arranged spaced apart and parallel to each other,
         wherein the first switch contact is designed for approaching the second switch contact until the first switch contact touches the latter and for establishing an electrical line connection to the second switch contact when force is applied,
      wherein:
         the push-button comprises a third switch contact which is arranged spaced apart from the second switch contact and in parallel on a side opposite to the first switch contact, and
         wherein the third switch contact is designed for approaching the second switch contact until the third switch contact touches the latter and for establishing an electrical line connection to the second switch contact when force is applied,
      an evaluation unit which is designed for additionally operating the first and/or the third switch contact(s) as a capacitive or inductive touch sensor, wherein a card number as well as a plurality of sequence numbers are allocated to the smart card, and
   at least one of an identification and transmission device, a secure element, a data memory, a display, an inductive touch sensor as well as a capacitive touch sensor, wherein the identification and transmission device can be connected to a card reading device, which is designed for accessing a payment service provider system, which is designed for accessing a network data storage,
   the method comprising:
      initialization steps comprising:
         allocating, in each case, one sequence number of a card number of the smart card to a credit card number or bank card number, and storing of said allocation in the data memory of the smart card as well as in the network data storage, which is accessible via a data network;

and operation steps including:

selecting a credit card number or bank card number by a user of the smart card by means of the smart card, transmitting the card number of the smart card and of the sequence number allocated to the selected bank card number or credit card number by the identification and transmission device to the card reading device, transmitting the card number of the smart card and of the sequence number by the card reading device to the payment service provider system, and retrieving the credit card number or bank card number allocated to the transmitted sequence number by the payment service provider system on the network data storage.

10. The method according to claim 9, wherein allocating the sequence number of the card number of the smart card is effected by connecting the smart card to a computer unit, which has access to the data memory of the smart card, as well as to the network data storage and is designed for executing a processing program which implements the initialization steps according to claim 9.

* * * * *